T. Hartley,
Brick Machine.
Nº 4,451. Patented Apr. 11, 1846.
2 Sheets. Sheet 1.
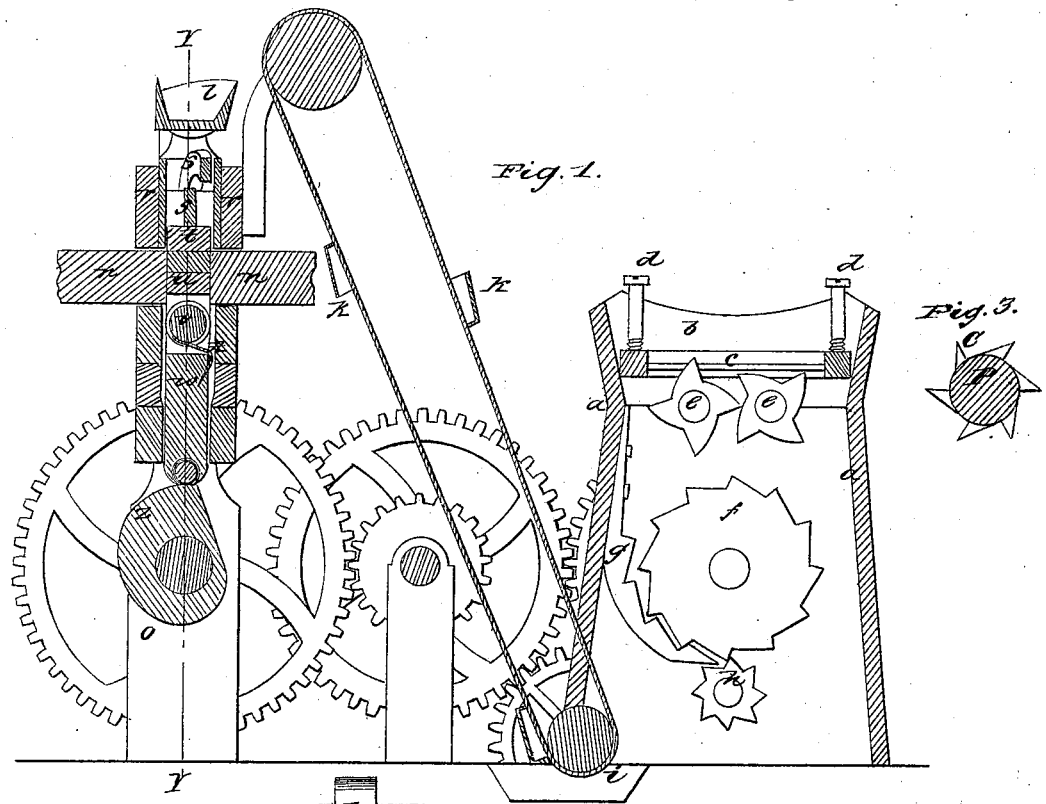
Fig. 1.
Fig. 3.
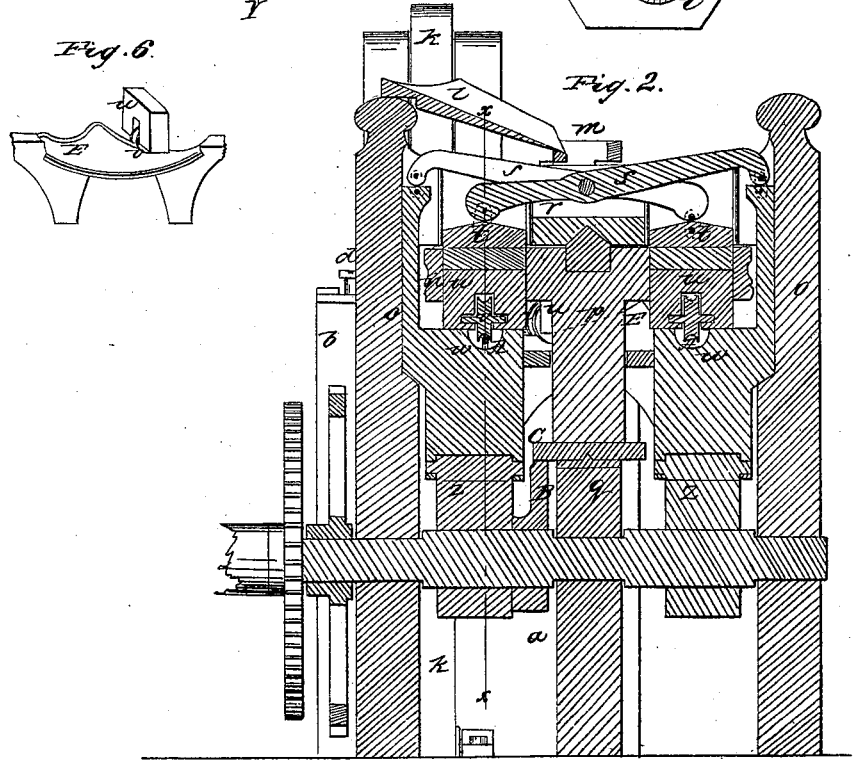
Fig. 6.
Fig. 2.

2 Sheets.Sheet 2.

T. Hartley,
Brick Machine.
Nº 4,451. Patented Apr. 11, 1846.

UNITED STATES PATENT OFFICE.

THOMAS HARTLEY, OF PITTSBURGH, PENNSYLVANIA.

BRICK-PRESS.

Specification of Letters Patent No. 4,451, dated April 11, 1846.

*To all whom it may concern:*

Be it known that I, THOMAS HARTLEY, pattern-maker, of Pittsburgh, in the county of Allegheny and State of Pennsylvania, have invented a new and useful Improvement in Brick-Presses, and that the following is a full, clear, and exact description of the principle or character thereof which distinguishes it from all other things before known and of the manner of making, constructing, and using the same, reference being had to the accompanying drawings, making part of this specification, in which—

Figure 5:
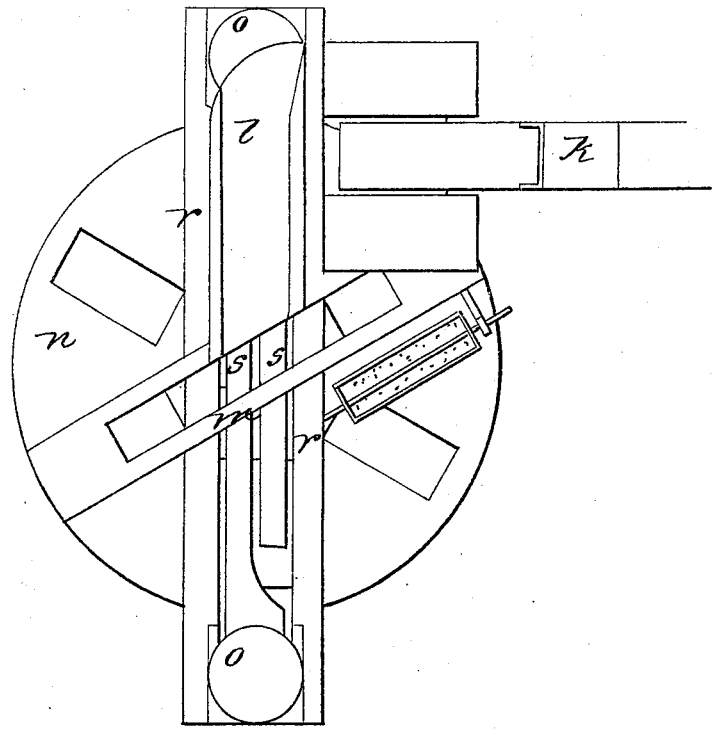
Figure 4:
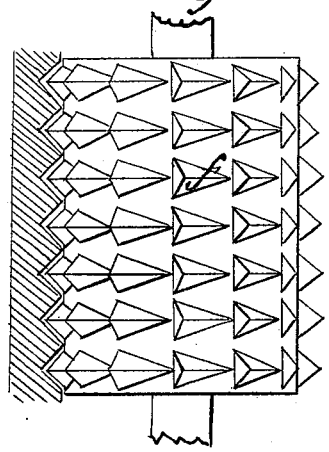

Figure 1 is a longitudinal section through the machine at the dotted line (X X) of Fig. 2; Fig. 2 is a cross section on line (Y Y) of Fig. 1; Fig. 3 is the cam wheel by which the brick molds are turned; Fig. 4, plan of cylinder, and Fig. 5, plan of press.

The same letters indicate like parts in all the figures.

The nature of my invention consists in the apparatus for grinding the clay, and the mode of pressing and delivering the bricks, the following being a description of its construction and operation.

On the top of a frame ($a$) of suitable height and strength to receive the grinding or mortar machinery, there is a hopper ($b$) with a grate ($c$) in its bottom which is adjusted to a proper height by screws ($d$) in the four corners thereof; just below this grating are two shafts ($e$) from which teeth project up through said grating, and serve to break the lumps of clay thrown into the hopper and to draw them through, causing them to fall onto a cylinder ($f$) below which is also armed with teeth and is shown in plan, Fig. 4; this cylinder works against a concave ($g$) and grinds the clay fine, a small clearing cylinder ($h$) being placed below the concave to clear the cylinder and throw the dirt onto the receiver ($i$) from which it is elevated by an endless band of buckets ($k$) of common construction, into a trough ($l$) from which it is conducted to the molds by the cross hopper ($m$).

The molds are formed in a horizontal wheel ($n$) that is sustained on a proper frame ($o$) by a vertical shaft ($p$) stepped into a post ($q$) of said frame. Above the wheel is a cross head ($r$) extending from one side post to the other, and formed of two pieces with a space between them; in this space are placed two levers ($s$), the short arm of each of which rests on a follower ($t$) attached by a link the size of a brick and directly over the mold in a cavity above and when the mold is brought under it by the revolution of the shaft ($p$) the clay is raised and then in forced back to a level with the mold; when in a state of rest this follower is a little above the mold, say, half an inch; in the bottom of the mold is another follower ($u$) which is furnished on its underside with a roller ($v$); this follower, when the mold is brought under the follower ($t$), rests on a piston ($w$) guided by grooves in the frame by which it is raised, one of the pistons is placed on each side of the vertical shaft so as to press two bricks at a time. An arm from each piston extends up outside of the wheel and also connects with the long arm of lever ($s$) above named so as to produce a pressure on each side of the brick at the same time—this is all clearly shown in Fig. 2.

The pressure is effected by cams ($z$) on a horizontal shaft geared to the same power that turns the mortar machine, as this cam ($z$) causes the piston ($w$) to rise, it forces up the follower ($u$), while at the same time the opposite upper follower ($t$) is pressed downward, thus giving to both sides of each brick a sufficient pressure. As the cam moves on the piston falls and the follower ($t$) rises, but the follower ($u$) is held up by a spring (A) that is attached to the piston ($w$) and bears against the roller ($v$) on said follower ($u$). The shaft ($p$) and wheel of molds are turned by means of an arm (B) on the cam shaft, which, just after the cams leave the pistons, strikes a cog (C) on said shaft, and pushes the wheel around so as to bring the next mold into position to be pressed, (a more perfect view of the cogs (C) on the shaft is shown in Fig. 3).

At each revolution of the cam shaft two bricks are pressed while two molds are filling and the shaft ($p$) turned the distance of one mold. A little stationary cam or elevator rail road (E), (see Figs. 2, and 6,) is fixed to the frame under the rollers ($v$) attached to the followers in the bottom of the molds, and serves to elevate said followers sufficiently (after they have left the press) to discharge the brick. The molds then pass under the usual sanding apparatus, and thence under the hoppers ($m$) above described where they are filled with clay.

Having thus fully described my improved brick machine what I claim as my invention and desire to secure by Letters Patent is—

1. The combination of the rollers (e, e, f f) adjustable grate (c) and concave (g) for grinding mortar substantially in the manner and for the purpose described.

2. I also claim the combination of the revolving molds and pressing apparatus pressing the brick on both sides the upper follower (t) not cutting the mold as herein described, by which a perfect brick is made sufficiently pressed on both sides and great rapidity of operation is secured substantially in the manner above made known.

THOMAS HARTLEY.

Witnesses:
A. P. BROWNE,
J. H. H. KELLER.